United States Patent [19]

Schuster

[11] Patent Number: 4,945,757

[45] Date of Patent: Aug. 7, 1990

[54] CONSTANT LEVEL LEAK DETECTION APPARATUS AND METHOD

[76] Inventor: Peter A. Schuster, 211 E. Grover, Kawkawlin, Mich. 48631

[21] Appl. No.: 345,688

[22] Filed: May 1, 1989

[51] Int. Cl.⁵ .............................................. G01M 3/32
[52] U.S. Cl. .................................................... 73/49.2
[58] Field of Search .................... 73/49.2, 302, 299; 340/6.5

[56] References Cited

U.S. PATENT DOCUMENTS

| | | | |
|---|---|---|---|
| 3,580,055 | 5/1981 | White | 73/49.2 |
| 4,474,054 | 10/1984 | Ainlay | 73/302 |
| 4,649,739 | 3/1987 | Horner | 73/49.2 |
| 4,672,842 | 6/1987 | Hasselman | 73/49.2 |
| 4,748,846 | 6/1988 | Haynes | 73/49.2 |
| 4,807,464 | 2/1989 | Janotta | 73/49.2 |
| 4,827,762 | 5/1989 | Hasselman | 73/49.2 |

*Primary Examiner*—Hezron E. Williams
*Attorney, Agent, or Firm*—John J. Swartz

[57] ABSTRACT

Apparatus for and method of testing whether a tank completely filled with liquid is leaking comprising a liquid containing standpipe in fluid communication with a tank to be tested, and mechanism for maintaining a substantially constant head pressure on the bottom of a tank being tested as the volume of liquid from the tank tends to expand or contract.

3 Claims, 2 Drawing Sheets

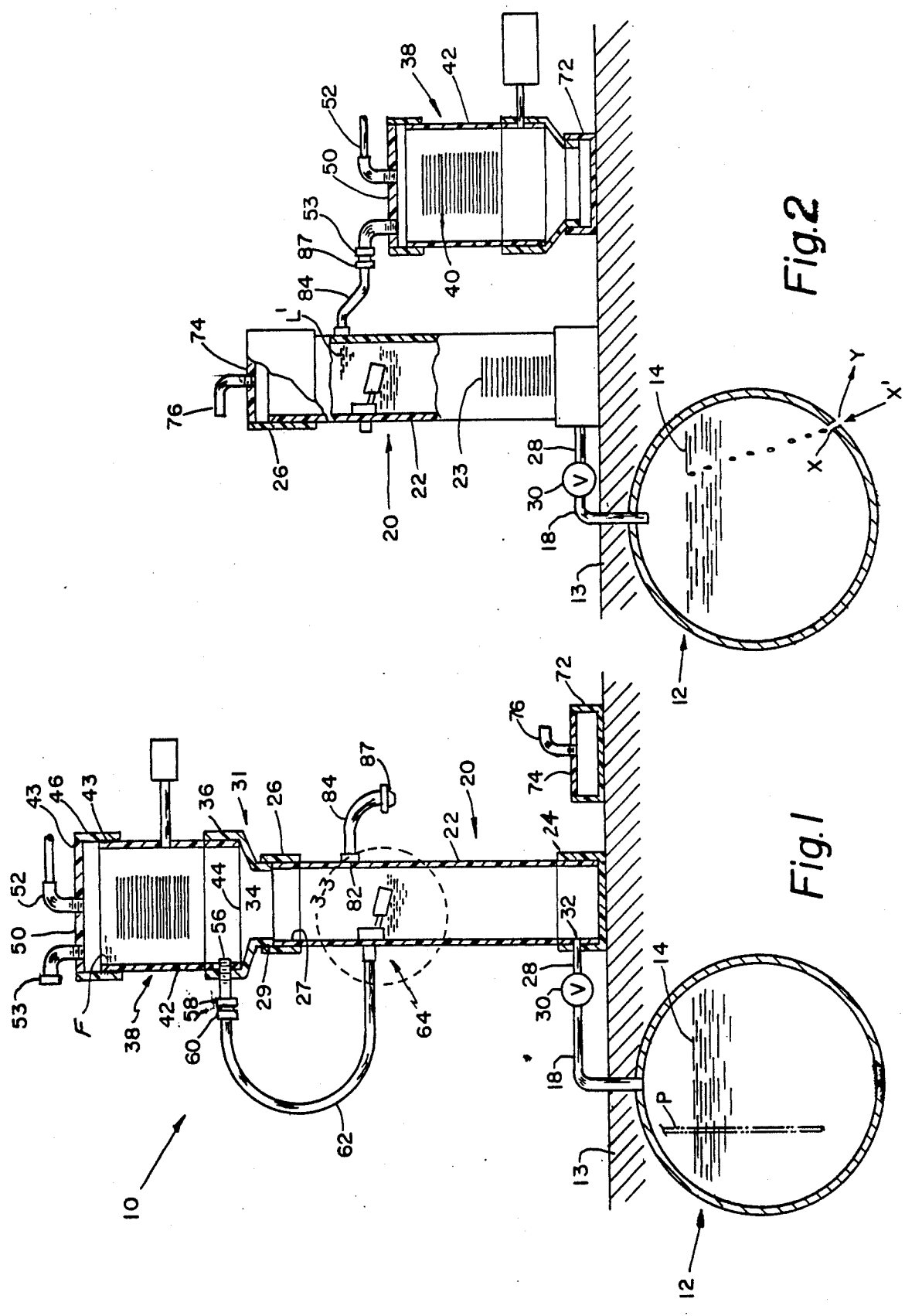

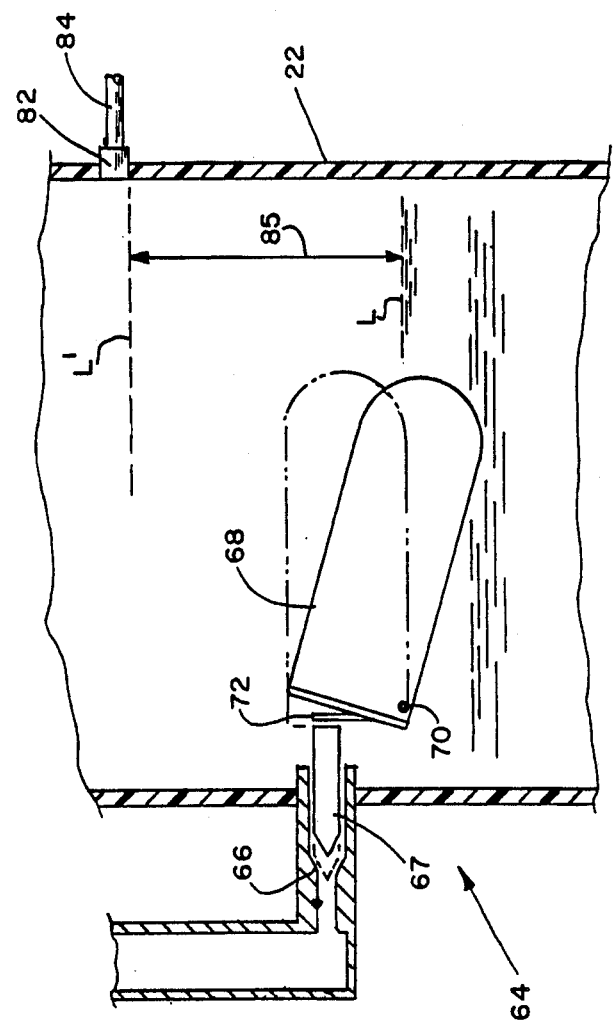

CONSTANT LEVEL LEAK DETECTION APPARATUS AND METHOD

BACKGROUND OF THE INVENTION

1. Field of the Invention

This relates to method and apparatus for testing whether a tank completely filled with liquid is leaking and more particularly to leak detection apparatus which will maintain a substantially constant head pressure on the tank during testing to determine if the tank is leaking.

2. Description of the Prior Art

Fuel storage tanks are typically stored underground. If a fuel tank leaks, it poses a serious health and environmental hazard to water supply systems and the like. Sometimes, relatively small leaks can, over a long period of time, cause substantial underground contamination.

It thus become important that method and apparatus be provided for determining the change in volume of fluid in the tank. To accomplish such tests, a standpipe has been heretofore utilized in connection with a tank. One prior art device, such as that disclosed in U.S. Pat. No. 3,580,055, issued to Richard B. White on May 25, 1971, includes a standpipe for establishing a fluid head in communication with the fluid in the tank to measure the change in volume of the fluid in the tank during the test period. This prior art system thus utilized a standpipe to apply additional head pressure to an underground storage tank during testing to determine if the tank leaks. The prior art device of the type disclosed included apparatus for returning or adjusting the height of the fluid head after the test is completed.

One of the problems common to the use of such a standpipe, however, is a diminishing leak rate. As the level in this prior art standpipe changes, either upwardly or downwardly, the level of head pressure also changes. By way of example, if the liquid level in the standpipe went down during the test, so would the amount of the pressure being exerted on the leak. Therefore, as the head pressure would decrease, so would the overall pressure on the inside of the tank and thus the leak rate would also decrease.

The current environmental standard as published by the "Environmental Protection Agency" as N.F.P.A. 329 sets forth the standard for the maximum leakage allowable in fuel tanks. Obviously, if there is a leak in the system and fuel is being emitted from the fuel tank, a decreasing volume in the fuel tank can be measured with various devices. The measurement of change of volume, however, must be tempered with the temperature of the fuel as well as a determination for the level of the surrounding water table. For example, an initial indication of a decreasing volume may falsely indicate a leak if the temperature is decreasing causing the volume to shrink due to temperature change.

The use of a standpipe to provide additional head pressure compensates for a high water table. For example, with a high water table, the pressure outside an underground tank could be equal to or greater than the pressure inside the tank thereby masking a leak. Also, the additional head pressure provided by the standpipes stabilizes vapor pockets that otherwise form at the top of a tank. Vapors can expand and contract with temperature change and unless removed or stabilized by pressure, could mask a leak. The additional head pressure applied to an air pocket by a standpipe will force it to be contained.

Additional head pressure provided by the standpipe is also utilized to stabilize the tank ends. As pressure builds in a tank, the tank ends commonly bulge and could mask a leak. The additional head pressure provided by the standpipe forces the tank ends to deflect to the maximum. As the level of the fluid in a typical standpipe lowers, the pressure on the overall tank is less and therefore, the tank walls will tend to contract because of less head pressure. This contributes to the error in test measurements. Accordingly, it is another object of the present invention to provide constant level leak detection apparatus and method which maintains a constant head pressure on the tank during testing.

It is another object of the present invention to provide a constant level leak detection system which substantially eliminates tank end deflection and declining leak rates due to liquid level changes in the detection system.

It is a further object of the present invention to provide leak test apparatus which will increase the accuracy of testing.

Another object of the present invention is to provide a new and novel leak detector which will eliminate tank end deflection due to changing head pressure.

Another object of the present invention is to provide a leak detector which will eliminate diminishing leak rates. Another object of the present invention is to provide a method and apparatus for leak testing which is more reliable and precise and eliminates diminishing leak rates as a factor for which there must be compensation.

It is another object of the present invention to provide a leak detector which is safer than other prior art detectors which utilize gas under pressure for maintaining a static head pressure.

Another object of the present invention is to provide a leak detector which utilizes liquid and not a gas above the volatile fuel for maintaining the constant head on the fuel.

It is still another object of the present invention to provide constant level leak detection apparatus and method which utilizes a single reservoir which is alternately positioned to supply liquid to or receive liquid from the tank being tested, depending on whether the liquid level in the tank is decreasing or increasing, respectively.

The following prior art patents are cited as being of interest to this construction although they do not disclose the invention disclosed herein:

| | | |
|---|---|---|
| 4,442,702 | Sawada | Apr. 17, 1984 |
| 4,474,054 | Ainlay | Oct. 2, 1984 |
| 4,571,987 | Horner | Feb. 25, 1986 |
| 4,649,739 | Horner | Mar. 17, 1987 |
| 4,679,425 | Bolland | Jul. 14, 1987 |
| 4,708,015 | Sharp | Nov. 24, 1987 |

Other objects and advantages of the present invention will become apparent to those of ordinary skill in the art a the description thereof proceeds.

SUMMARY OF THE INVENTION

Leak detection apparatus and method for testing a leak in a tank completely filled with liquid comprising: a standpipe in liquid communication with, a tank to be tested, the standpipe being adapted to be filled with liquid, identical to the liquid being tested, to a predetermined level; and mechanism, coupled to the standpipe, for maintaining the level of liquid in the standpipe substantially constant as the volume of liquid in the tank tends to expand or contract.

BRIEF DESCRIPTION OF THE DRAWINGS

The invention may be more readily understood by referring to the accompanying drawings, in which:

FIG. 1 is a sectional side elevational view of apparatus constructed according to the present invention coupled to an underground tank to be tested with the reservoir being illustrated in one position for testing a leak when the liquid level in the tank is decreasing;

FIG. 2 is a similar side elevational view illustrating the reservoir in an adjusted position for testing a leak when the liquid level within a tank is increasing; and FIG. 3 is an enlarged sectional side elevational view, illustrating the portion encircled in the chain lines 3—3 of FIG. 1.

DESCRIPTION OF THE PREFERRED EMBODIMENT

Apparatus, generally designated 10, constructed according to the present invention, is particularly adapted for use in testing an underground fuel storage tank, generally designated 12. The tank 12 is illustrated as being a right circular cylindrical. The tank is completely filled with gasoline or other fuel, generally designated 14. The fuel storage tank 12 is provided with a fuel pipe 18 which, for purposes of tests, will be completely filled with fuel 14. The tank 12 is embedded in the ground as illustrated at 13. The apparatus, generally designated 10, includes a transparent standpipe, generally designated 20, including a clear plastic, open ended upstanding cylindrical cylinder 22 mounted in an upwardly opening end cap 24. The cylinder 22 includes a plurality of vertically spaced graduations 23 thereon for indicating the level of fluid within the container cylinder 22.

The standpipe cylinder 22 is in fluid communication with the fuel tank 12 via a conduit 18 passing thru an opening 32 in the sidewall of the end cap 24 and cylinder 22. A valve 30 is connected in line with the conduit 18 for selectively opening and closing the line 18. When the valve 30 is opened, the fluid in standpipe 20 is allowed to freely flow to the tank 12 and maintain the tank 12 and line 18 completely filled.

The description that follows will assume that the system is configured as illustrated in FIG. 1 for testing a leak. Mounted atop the upper end of cylinder 22 is an enlarged diameter fuel supply reservoir, generally designated 38. The reservoir 38 is mounted via a sleeve 26 which is slip-fit at 27 on the upper end of the cylinder 22. The reservoir 38 provides make-up fuel to the standpipe 20 which in turn provides make-up fuel to tank 12. The upper half of the sleeve 26 is internally threaded at 29 for threadedly receiving a reservoir mounting yoke, generally designated 31. The yoke 31 includes a reduced diameter lower portion 34, which is externally threaded to mate with the sleeve 26, and an enlarged diameter reservoir mounting cylindrical portion 36 which receives the lower end of a transparent reservoir cylinder, generally designated 38 having a plurality of vertically spaced graduations 40 thereon.

The standpipe 20 and reservoir cylinder 38 are made of clear polyvinyl chloride (PVC) material. The reservoir cylinder 38 includes a cylindrical sidewall 42 having an integral bottom wall 44 and is provided for storing liquid petroleum which is identical to the petroleum 14 stored in the tank 12. A sleeve 46, similar except for size to the sleeve 26 is mounted at the upper end of the cylinder 38 and is internally threaded at 43 for threadedly receiving a plug, generally designated 50. The plug 50 includes a vent 52 which is provided for equalizing the atmospheric pressure within the reservoir cylinder 38. The plug 50 inhibits evaporation of the fuel schematically designated F in the cylinder 42.

A female disconnect 53 is also mounted in the plug 50 for a purpose to be described more particularly hereinafter. An overflow opening 82 is provided in the side wall of reservoir cylinder 22 at a level a predetermined distance 85 above the level of fuel L to be maintained in the cylinder. An overflow tube 84 having a male disconnect member 87 is attached thereto for mating the female disconnect member 53 as will become apparent as the description thereof proceeds in describing the alternate configuration of the parts.

The standpipe cylinder 22 is in liquid communication with reservoir cylinder 38 via a conduit 62 communicating with the lower end 56 of reservoir cylinder 39. A female connector schematically designated 58 receives a male quick connector 60 which is attached to a tube 54 connected to a valve, generally designated 64. The female connector 58 is of the type which, when not mating with male connector 60, will close to preclude the flow of liquid fuel therethrough from reservoir cylinder 38.

The valve 64 includes a female valve seat 66 receiving a male plunger 67. The plunger is moved between the unblocking position illustrated in solid lines in FIG. 3 and the fuel blocking position illustrated in chain lines in FIG. 3 via a float 68 pivotally mounted on pin 70 disposed within the standpipe 22. When the float 68 moves upwardly from the position illustrated in solid lines in FIG. 3 to the position illustrated in chain lines in FIG. 3, a tab 72 mounted on the float force the plunger 67 from the position illustrated in solid lines to the flow blocking position illustrated in chain lines to preclude the fluid from entering the standpipe 22.

If the fuel level L in standpipe 22 tends to lower from illustrated in FIG. 1 due to fuel being emitted thru a leak opening x in the tank wall 12, the float 68 will move downwardly and fluid in reservoir cylinder 39 will be admitted thru tube 62 to keep the level L constant.

Adjacent the receptacle 24 is an upwardly opening internally threaded mounting storage cup 72 having an internal diameter equal to the internal diameter of sleeve 26. The cup member 72 threadedly receives a plug 74 mounting an air vent 76.

Referring now to configuration illustrated in FIG. 2, the plug 74 is now removed from receptacle 72 and the male connector 60 is disconnected from female connector 58. The reservoir 38 and yoke 31 is removed from the sleeve 26 at the upper end of standpipe 22, and threaded into the internally threaded receptacle 72.

The plug 74, including vent 76 is now mounted in the internally threaded sleeve 26 at the upper end of the standpipe 20. The male coupling member 87 on overflow hose 84 is coupled to the female quick disconnect 53 at the upper end of reservoir 20.

The apparatus when configured as illustrated in FIG. 2 is utilized when the liquid level within the tank 12 is increasing. This might occur, for example, when the water table is extremely high and water passes inwardly through leak opening x to the tank 14, in the direction of the arrow x', because of a high water table. This forces the volume of fluid 14 within tank 12 to expand and move upwardly into the standpipe 22.

The quick connectors 58, 60 and 53, 87 may be such as that model no. 298 PO 4 manufactured by Imperial Eastman Corporation.

At the present time, it is the standard to maintain a head of 4 pounds per square inch on the bottom of the tank at the time of the test. If there is a water level on the outside of the tank and a leak is below the water table, one must subtract the outside pressure in order to determine the amount of the leak.

As the level of the liquid rises due to the fluid in tank 12 expanding, the fluid will rise to a level L'. The liquid level in standpipe 20 will remain constant at level L' as the fluid within tank 12 tends to increase as any overflow will pass through overflow opening 82 into reservoir 38 via tube 84.

As the liquid collects in the reservoir 38, the user can visually determine the increasing liquid in reservoir 38 and thus visually determine the amount of water passing into the tank which is directly correlated to the increasing liquid in reservoir 38. The graduations 40 are so spaced and calibrated that when the level in reservoir 38 increases from one graduation to another, this is equivalent to a change of volume in the tank 12 of 0.0034 gallons.

THE OPERATION

The apparatus, generally designated 10, is coupled to the fill pipe 18 of fuel tank 12. The tank must be "topped off" and allowed to settle out, preferrably for several hours. The temperature of the fuel 14 in the underground tank 12 will stratify and be at different temperatures at different levels when allowed to settle out.

The standpipe 20 is filled with fuel identical to the fuel in the tank 14 to the level L. The value 30 is open to completely fill the tank 14. Any air in the tank system is to be removed.

A temperature probe, schematically designated P, may be provided internally of the tank 14 to determine the temperature of the fuel therein. When the temperature ceases to vary, the user will know that the fuel is stratified.

At this stage, the user will be able to determine whether or not the liquid level is increasing or decreasing. Approximately 99 percent of the time, the liquid is increasing or decreasing because of expansion and contraction due to temperature change. If the liquid level L in standpipe 20 is rising, the apparatus will be configurated as illustrated in FIG. 2. If the liquid level is going downwardly, the apparatus will be configured as illustrated in FIG. 1.

Assuming that the liquid level is tending to go downwardly, the male and female connectors 60 and 58 are coupled together and provide make up fuel in cylinder 22. The liquid in standpipe cylinder 22 will rise until it reaches the level illustrated at L at which time the float 68 will cause the valve 64 to close and preclude any further liquid from entering the standpipe cylinder 22 from the reservoir 38.

If the tank 12 leaks through opening X, fuel will pass outwardly in the direction of the arrow Y. The fuel in standpipe 20 will tend to move into the tank 12 to replace the volume which has escaped. When that happens, the float 68 will move downwardly and fuel will be admitted thru the valve 64 to maintain the level L and thus keep a constant static head on the tank 12. In this way, the device automatically maintains a constant head pressure on the tank during testing. This helps eliminate tank end deflection and declining leak rates due to liquid level changes.

Measurement of the liquid level loss in reservoir 38 can be measured by visually reading the graduations on graduated reservoir cylinder 42. If desired, a pressure transducer can be attached to the graduated cylinder 38 by suitable hose. Such a transducer could convert the pressure sensed to an electrical signal which would be sent to a digital meter and any change in pressure would cause a digital change in the numbers on the digital meter in direct relationship.

Assuming that the level of the fuel in the tank is increasing due to an increased water table, the parts will be configured as illustrated in FIG. 2. The liquid volume which is coming into the tank will cause the fluid level in cylinder 22 to move upwardly to the position illustrated at L' in FIG. 3. The opening 82 will preclude the level L from raising thereabove and thus will be maintained constant during the remainder of the test.

Any overflow passing thru opening 82 and tube 84 will be received by the reservoir 38 and the operator can again read the graduations 40 to determine the volume of fluid admitted thereto.

The head pressure will thus be maintained at level L or L' depending on which type test is being run and thus the pressure of the liquid in the tank will remain substantially constant.

The apparatus constructed according to the present invention automatically remains at a constant head pressure on the bottom of the tank 12. The apparatus constructed according to the present invention eliminates tank end deflection of the tank due to changing head pressure during the test. The apparatus also eliminates the operator having to calibrate as the volume of the reservoir 38 is known.

The apparatus constructed according to the present invention also eliminates diminishing leak rates because the head pressure is constant and therefore, so is the leak rate.

The apparatus also utilizes a system for volumetrically measuring the leak rate. With other systems, it is difficult to determine minute changes. This system also accounts for water table. Test accuracy is improved because the test accounts for temperature, evaporation, tank end deflection, water table and vapor pockets.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Leak detection apparatus for testing whether a tank completely filed with liquid is leaking comprising:
    means, including a liquid containing standpipe in liquid communication with a tank to be tested, responsive to the liquid level in said standpipe for maintaining a substantially constant liquid head pressure on the bottom of a tank being tested as the volume of liquid in the tank tends to expand or contract;
    said means for maintaining a substantially constant head pressure comprising means for maintaining the liquid level in said standpipe substantially constant when the liquid volume in said tank expands or diminishes;

said means for maintaining the liquid level substantially constant comprising a liquid container conduit means in fluid communication between said standpipe and said container; and means for selectively mounting said container at lower and high elevations; and means for measuring change in volume in said liquid container;

said conduit means including a first conduit for coupling the lower end of said container to a first portion of said standpipe when said container is mounted at said higher elevation, and a second conduit for coupling the upper end of said container to a second portion of said standpipe when said container is mounted at said lower elevation.

2. The apparatus set forth in claim 1 wherein said second portion of said standpipe is at a higher level than said first portion of said standpipe.

3. Leak detection apparatus for testing a leak in a tank completely filled with liquid comprising:

a standpipe in liquid communication with, the upper side of a tank to be tested and adapted to be filled with liquid, to a predetermined level;

means, coupled to said standpipe, for maintaining the level of liquid in said standpipe substantially constant as the volume of liquid in the tank tends to expand or contract comprising a liquid container including a plurality of vertically spaced graduations to provide a visual indication of the liquid level therein, and means for communicating liquid between said container and said standpipe as said liquid volume changes;

mount means for selectively mounting said container on or adjacent to said standpipe;

said standpipe including an inlet port and discharge port means in vertically spaced relation with said inlet port;

said liquid communicating means comprising tube means in fluid communication with said container and said inlet port, when said container is mounted on said standpipe, for allowing liquid to flow under the force of gravity from said container to said standpipe;

valve means responsive to the liquid in said standpipe reaching a predetermined level for interrupting the flow of liquid thereto; and second tube means in fluid communication with said container and said discharge port means, when said container is mounted adjacent said standpipe, for allowing liquid to flow, under the force of gravity from said standpipe to said container when the liquid in said container reaches a predetermined greater level.

* * * * *